United States Patent [19]

Arndt

[11] 3,784,751

[45] Jan. 8, 1974

[54] PDM-TDM SWITCHING MATRIX

[75] Inventor: Robert C. Arndt, Silver Spring, Md.

[73] Assignee: The United States of America as represented by the Secretary of the Army, Washington, D.C.

[22] Filed: Nov. 16, 1971

[21] Appl. No.: 199,177

[52] U.S. Cl. ....... 179/15 A, 179/15 AT, 179/15 BS, 179/18 GF

[51] Int. Cl. ........ H04j 3/04

[58] Field of Search ........ 179/15 BL, 15 BA, 179/15 AQ, 15 AT, 18 GF, 15 A, 15 BS; 178/69.5 R

[56] References Cited

UNITED STATES PATENTS

| | | | |
|---|---|---|---|
| 3,678,205 | 7/1972 | Cohen et al. | 179/15 AQ |
| 2,857,463 | 10/1958 | Trousdale | 179/15 AT |
| 3,087,992 | 4/1963 | Turner | 179/15 BL |
| 3,639,693 | 2/1972 | Bartlett et al. | 179/15 A |
| 2,910,542 | 10/1959 | Harris | 179/15 AT |
| 3,458,659 | 7/1969 | Sternung | 179/15 AQ |
| 3,204,043 | 8/1965 | Arseneau et al. | 179/15 AT |
| 3,263,030 | 7/1966 | Stiefel et al. | 179/15 AT |

OTHER PUBLICATIONS

IBM Technical Disclosure, Vol. 6, No. 4, Sept. 1963, "Data Transfer Matrix."

*Primary Examiner*—Kathleen H. Claffy
*Assistant Examiner*—Thomas D'Amico

[57] ABSTRACT

A switching matrix for making electrical connection between any one of a number of input lines and any one of a number of output lines. The signal to be switched will be on one of the input lines. This signal first modulates a carrier signal and then is multiplexed with the other input signals in an input subsection into a single signal stream. Several streams may be present, dependent on the total number of inputs, as the number of inputs in a subsection is limited. These signal streams are then fed to each output subsection. Each output subsection has one output line. The desired output line is first selected, thus selecting an associated output subsection. At the output subsection, that particular signal stream containing the desired input signal is first selected from all the streams available. The one desired input signal is then selected from all the signals available in the stream, and subsequently appears on the desired output line.

7 Claims, 3 Drawing Figures

INVENTOR
ROBERT C. ARNDT
BY
ATTORNEY

INVENTOR
ROBERT C. ARNDT

BY

ATTORNEY

PDM-TDM SWITCHING MATRIX

BACKGROUND OF THE INVENTION

The present invention relates to the electrical switching art, its purpose being to switch a signal appearing on an input line to a desired output line. The prior art utilizes conventional cross-point hardware configuration. Thus, the number of input and output lines that can be accommodated in a particular switching array is limited by the physical limitations of the circuitry necessary to achieve cross-point configuration. Each increase in capability of a prior art switching matrix requires a complex of additional hard-wire connections and other components. The problems thus presented by the prior art are how to accommodate a large number of input and output lines, without substantially increasing the size and/or complexity of the switching means, and how to devise a switching means in which the number of input and output lines may be easily varied, without substantial circuit changes. The problems thus presented by the prior art are solved by the present invention by utilizing modulation and multiplexing techniques.

SUMMARY OF THE INVENTION

An object of the present invention is to provide a switching matrix having a substantially serial switching capability.

Another object of the present invention is to eliminate and/or minimize conventional cross-point wiring in a switching matrix.

A further object of the present invention is to provide a switching matrix having an extremely large capacity for input and output lines.

A still further object of the present invention is to provide a switching matrix in which the number of input and/or output lines may be easily varied.

In accordance with these objects, the present invention utilizes a means to combine input signals into a serial stream, other means then being used to recover the one desired input signal and routing that signal to any one of the available output lines.

More specifically, the invention utilizes three different sections to accomplish its stated objectives. The input section uses standard modulating and multiplexing techniques to transform parallel input signals into several serial signal streams. Each signal stream thus contains a number of pulse duration modulated, time division multiplexed input signals. These signal streams are then fed as inputs to each of the output subsections of the switching array, each output subsection having one output line. A control section controls the selection of the one desired input to be switched from its associated signal stream. The control section also controls the selection of the output line to which the input signal is to be switched. The output array, under control of the control section, first selects the proper PDM-TDM stream in which the desired signal is located, and then selects the desired signal itself from that stream, and routes it to the selected output line. The control section synchronizes the operation of the input and the output equipment, temporarily stores the location of the desired PDM-TDM stream, the desired input signal and the desired output line in memory, and insures that the output equipment will pass the desired input signal to the desired output line. Thus, the present invention modulates and multiplexes input signals into PDM-TDM streams, and synchronizes the input and output equipment via the common control in order to pass a selected input signal to a desired output line.

DESCRIPTION OF THE PREFERRED EMBODIMENT

The PDM-TDM switching matrix consists of three basic sections: the input, the output and the common control. The input and the output have both signal path circuits and control circuits within them. A brief description of each section follows.

THE INPUT SECTION

Figure 1:
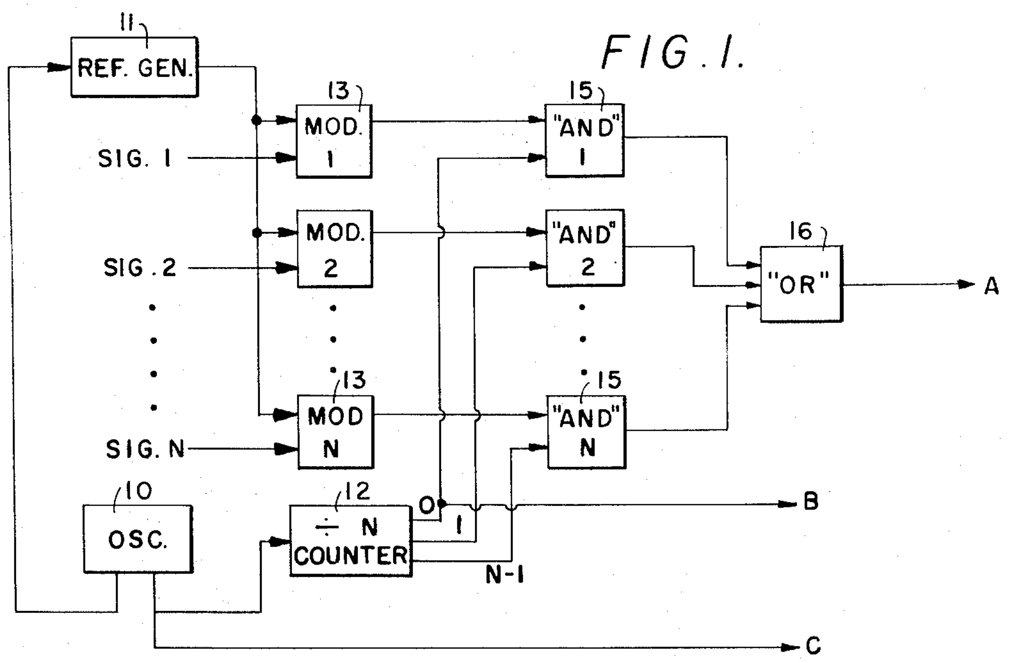
FIG. 1 is a typical input subsection.

The input consists of some number (M) of independent identical input subsections, each subsection accepting a number (N) of input signal lines. Referring to FIG. 1, the control circuit of each input subsection contains an oscillator 10 which drives a carrier reference generator 11 (triangle wave generator) and a divide-by-N counter 12, where N is the number of input signals accommodated by an input subsection in actual operation. The carrier reference generator signal is routed to a plurality of signal modulators 13—13, (1–N) and the carrier signal is modulated by individual input signals. There is an individual signal modulator for each input signal accommodated by an input subsection, as shown in FIG. 1. Each input signal thus modulates the reference carrier signal and produces a PDM (pulse-duration-modulation) carrier signal. The outputs from the modulators are then sampled by individual logical "and" gates, designated by the numeral 15—15 (1–N) under the control of the divide-by-N counter. The divide-by-N counter produces a gating pulse for each input signal, sequentially enabling each "and" gate from "and" gate 1 through "and" gate N of an input subsection.

Referring again to FIG. 1, it can be seen that each PDM carrier signal is routed to a specific "and" gate and that each "and" gate is connected to the divide-by-N counter. The divide-by-N counter is driven by the oscillator which drives the reference generator, so that the operation of the divide-by-N counter 12 is synchronized with the operation of the reference generator. The divide-by-N counter sequentially enables each individual "and" gate, thus sampling each one of the PDM carriers once during a cycle of the divide-by-N counter 12. The outputs of these "and" sampling gates are then fed to a logical "or" gate 16. The output of the "or" gate is a single stream of the outputs of the individual "and" gates. This process is well-known as time division multiplexing. Thus, the signal stream A in FIG. 1 can be accurately characterized as a PDM-TDM signal stream. At this point, all of the input signals coming into a typical input subsection, as shown in FIG. 1, have been modulated and multiplexed into a single signal stream. This output A, which contains a "N" number of PDM signals, multiplexed into a single TDM stream, is routed as an input to all of the output subsections of the switch matrix. The output C of the oscillator 10 in FIG. 1 is also provided as an input to all of the output subsections of the switching matrix and to the common control section. Additionally, a signal is sent to the common control sections from the divide-by-N counter when the counter is in the zero state. This output is designated B in FIG. 1. This pulse corresponds in time to the sampling time of input signal 1.

THE OUTPUT SECTION

Figure 2:
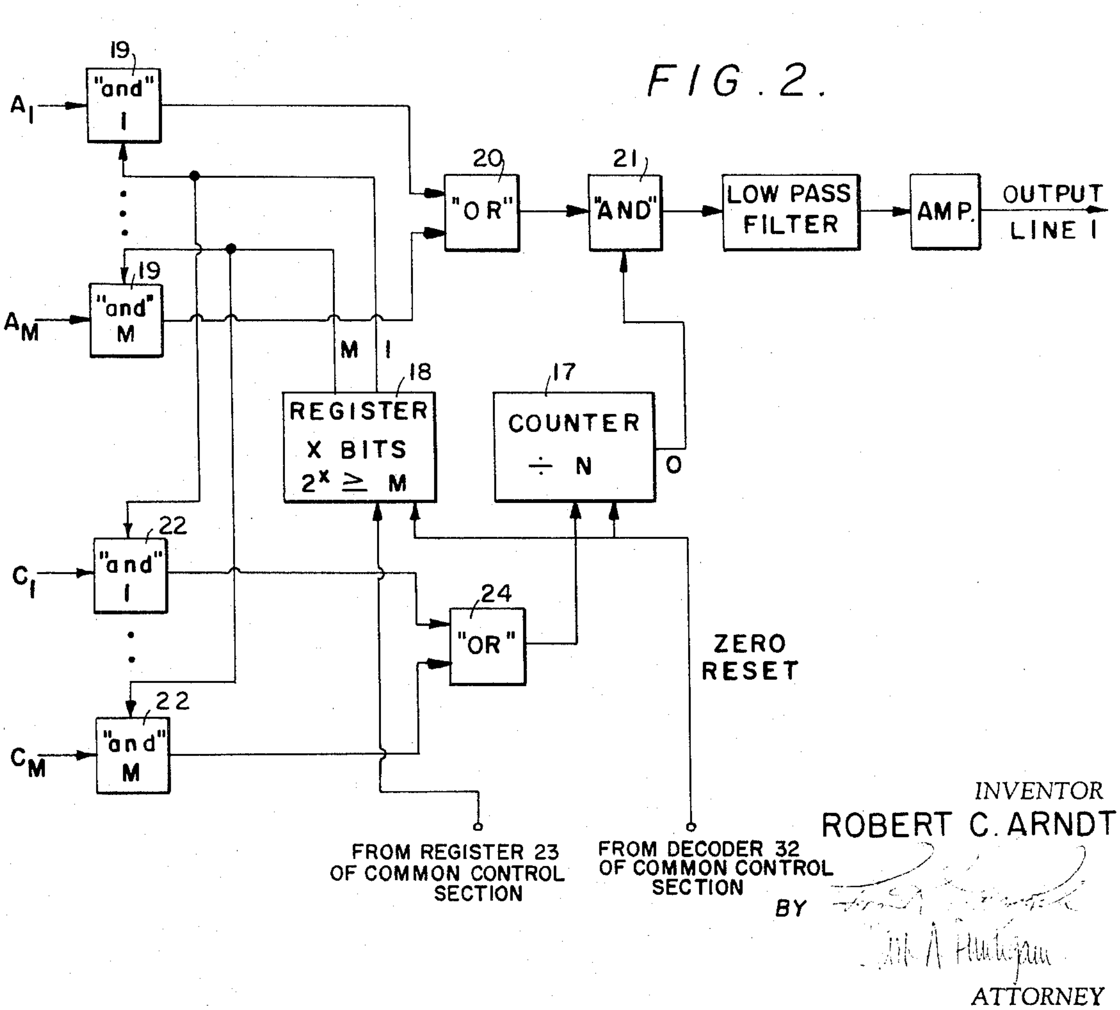
FIG. 2 is a typical output subsection.

The output section consists of some number (P) of identical output subsections, each subsection yielding one output signal line (1–P). Additionally, some number (R) of output sections can be combined to form an output array. The total number of subsections in the output array does not necessarily coincide with the number of input subsections, but depends only on the number of output lines required. Referring to FIG. 2, which shows a typical output subsection, the control circuit present in each output subsection consists of a divide-by-N counter 17, a register 18 (capacity in accordance with the formula 2 ≥ M, where $x$ is the capacity in bits, and M is the number of input subsections) and two sets of logical "and" gates, one set designated by the numerals 19–19 (1–M) and the other set by 22–22 (1–M) with their corresponding "or" gates, 20 and 24. The control circuitry in the output array functions as follows: the value that has been placed in the register 18 corresponds to one of the M number of PDM-TDM streams. The register then enables that "and" gate pair 19–19 which corresponds to the one desired signal stream, out of the "M" number available. Referring again to FIG. 2, the x bit register also enables the one "and" gate 22—22 associated with the particular oscillator corresponding to the M stream (one of M subsections) desired. Thus, the first step in this selection process by the output array has been accomplished. One particular PDM-TDM stream of input signals has been selected out of the M number available. Referring to FIG. 1, the output A and the output C (the output from the oscillator associated with the particular input stream) have been selected out of the M number available. The appropriate "and" gates in the first stage of the output array, as seen in FIG. 2, (those "and" gates associated with the outputs A and C of the particular input section selected) are now enabled by the $x$ bit register. Signals A and C are thus passed by the "and" gates.

Again referring to FIG. 2, the selected oscillator input signal C, after passing through the appropriate "and" gate 22—22, next passes through an "or" gate 24 and on to the divide-by-N counter 17. The selected oscillator thus drives the divide-by-N counter, causing it to count in synchronization with the sequence of N signals multiplexed in the associated PDM-TDM signal stream. Since the signals in the PDM-TDM stream are sequenced according to the operation of the reference oscillator 10, as explained above, the counter 17 is synchronized with this sequencing because the counter is driven by the same source, namely the oscillator 10. The divide-by-N counter 17 is reset at the beginning of the selection process to the state at a time corresponding to the occurrence in time of the PDM pulse of the one wanted input signal. It will be remembered from the above that with the N number of signals multiplexed in the PDM-TDM stream that any one signal out of the N number in the stream will occur once in the period of the divide-by-N counter 12. The timing for the zero reset of the divide-by-N counter 17 is accomplished by the common control section. Every succeeding time the counter 17 is in its zero state, which corresponds in time to the occurrence of the PDM pulse of the desired input signal in the overall period of the PDM-TDM stream, the counter enables a recovery "and" gate 21. This allows the desired signal to pass to a low pass filter for demodulation and recovery. This operation completes the second step of recovery of the wanted signal by the output array. It is the selection of the one desired input signal out of the N number available in a PDM-TDM stream. In summary, the switching or selection process is accomplished in two phases: selection of the proper PDM-TDM stream out of the M number available (accomplished by the $x$ bit register enabling the appropriate "and" gates) and selection of the one wanted PDM signal out of the N number available (accomplished by the divide-by-N counter 17 counting in synchronization with the reference oscillator, the reset to 0 being done once per recovery operation). The control information, namely the x bit register value and the zero reset of the divide-by-N counter is supplied by the common control section.

COMMON CONTROL SECTION

Figure 3:
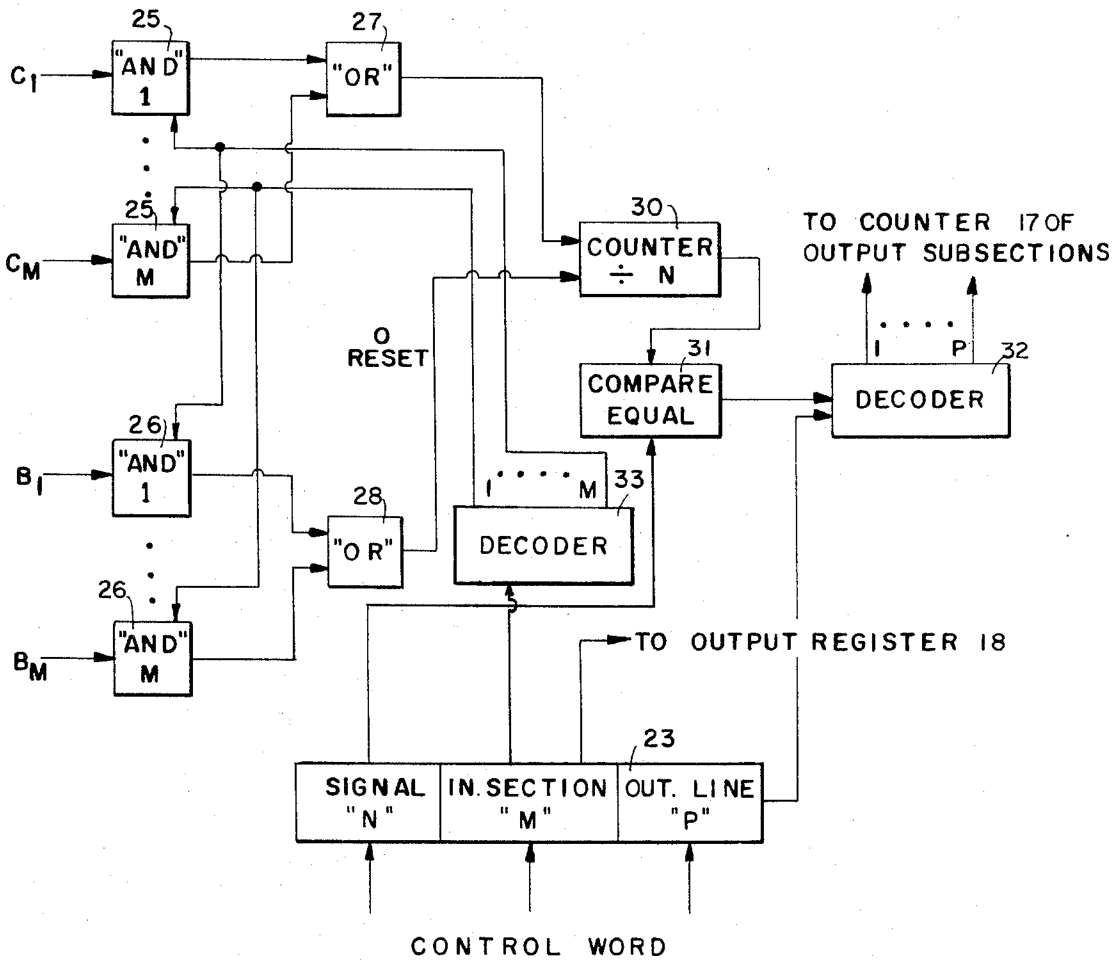
FIG. 3 is a typical common control section.

The common control section of the switch consists of some number (R) of common control subsections, one for each output section. Referring to FIG. 3, each common control subsection consists of the following logical circuits: an input register 23 for temporary storage (memory) of the input control word, said word consisting of the appropriate number of bits corresponding to the one selected PDM-TDM stream out of the M number available, the appropriate number of bits corresponding to the one desired PDM input signal out of the N number available, and the appropriate number of bits corresponding to the one output line desired out of the P number available per output section; two sets of N logical "and" gates 25—25 and 26—26 with their corresponding "or" gates 27, 28; a divide-by-N counter 30; an equal-to comparison circuit 31; and decoders 32 and 33, series of "and" gates which enable the appropriate lines out of the P and M number available. A "decoder" is a well-known term which is used to define a circuit by which bistable memory representations are changed to their digital equivalent.

The operation of the common control circuits will now be described. The control word is received into the three sections of the input register. The control word is the communication between the operator and the machine. One section receives into memory the location (1–M) of the desired PDM-TDM stream out of the M number available. This value is read into the $x$ bit register 18 from this memory. The second section of the memory contains the location (1–N) of the desired input signal out of the N number multiplexed in the PDM-TDM stream. The third section of the memory contains the location (1–P) of the output line upon which the desired signal should appear. This section selects the particular output subsection out of the P number available which will never recover the desired signal and send the desired signal on its output line.

Referring to FIG. 3, the M bit portion of the word through decoder 33 enables the appropriate "and" gate 25—25, thus selecting the oscillator and the pulse line associated with that input subsection which contains the input signal that is to be switched to the desired output line. Referring to FIG. 1, the signal identified as B in the first pulse (in time) of the divide-by-N counter 12 sequence. This signal B is provided as an input to the common control section, the appropriate "and" gate in the common control section 26—26 being enabled by the memory 23. The signal B which is associated with the desired signal stream (1–M) is thus allowed to pass in the control circuitry. Referring to FIG. 3, the divide-by-N counter 30 is reset to zero by the signal B and counts at a rate determined by the selected oscillator (signal C). Since the signal B is essentially a beginning-of-period pulse of the reference oscillator, the divide-by-N counter 30 of the common control is counting in synchronization with the corresponding divide-by-N counter 12 in the selected input subsection. When the value in the divide-by-N counter 30 in the common control section is identical to the value of the N bit portion of the control word in the memory 23, an output pulse is generated by the "compare equal" circuit 31. This pulse is logically "and'ed" with the P bit value of the control word, (the location (1–P) of the desired output line) in the decoder 32, producing a pulse on the desired line from the decoder 32 out of the P number of lines available, at a time corresponding to the occurrence of the desired PDM signal. This pulse enables the desired output subsection which contains the desired output line. Thus, the output subsection corresponding to the desired output line is enabled by the common control section at the correct time and the desired signal thus appears at the correct output line.

It is to be understood that the above-described embodiment of the invention is merely illustrative of the principles thereof and that numerous modifications of the invention may be derived within the spirit and scope thereof.

What is claimed is:

1. An electrical switching matrix comprising: a plurality of groups of sources of input signals;
 means for forming one serial signal stream from each of the groups of input signals, said means including a source of clock pulses for each of said serial signal streams;
 at least one output terminal;
 means coupled to all of said stream-forming means for controlling the recovery of a selected input signal at a designated output terminal, said control means including:
  means for designating the output terminal, a selected serial signal stream and a selected input signal within said selected stream;
 a first counter driven by the clock pulse for said selected serial signal stream; and
 an enabling means responsive to said first counter and said designating means;
 and means coupled to all of said stream-forming means, said control means and said output terminal for recovering the selected input signal at said designated output terminal, said recovery means including:
  means responsive to said designating means for passing said selected serial signal stream; and
  a second counter responsive to said enabling means and driven by the clock pulses for said selected serial signal stream for controlling the passage of the selected input signal to the designated output terminal.

2. An electrical switching matrix in accordance with claim 1, wherein said recovery means includes:
 a register connected to said designating means of said control means; and
 a first series of "and" gates associated with said serial signal streams, said first series of "and" gates connected to said register for recovering the said selected one of said serial signal streams.

3. An electrical switching matrix according to claim 1, wherein said control means includes a compare-equal circuit, said compare-equal circuit connected to said first counter and said designating means, said compare-equal circuit having an output in time coincident with the selected input signal for enabling said recovery means to recover said selected input signal.

4. An electrical switching matrix according to claim 2, wherein said control means includes:
 a second series of "and" gates, said second series of "and" gates associated with said input signals and connected to said designating means; and
 a first "or" gate, said "or" gate connected to said second series of "and" gates, the output of said "or" gate being connected to said first counter.

5. An electrical switching matrix in accordance with claim 4, wherein the means for forming a serial signal stream includes means for modulating a reference wave by said input signals and means for multiplexing the modulated signals into a single stream.

6. An electrical switching matrix in accordance with claim 5, wherein the means for modulating includes one modulator for each input signal.

7. An electrical switching matrix in accordance with claim 6, wherein said recovery means may include more than one recovery means, each recovery means having one output line.

* * * * *